Dec. 5, 1950        B. J. BOR        2,532,887
SLED CONSTRUCTION
Filed Nov. 2, 1945        3 Sheets-Sheet 1
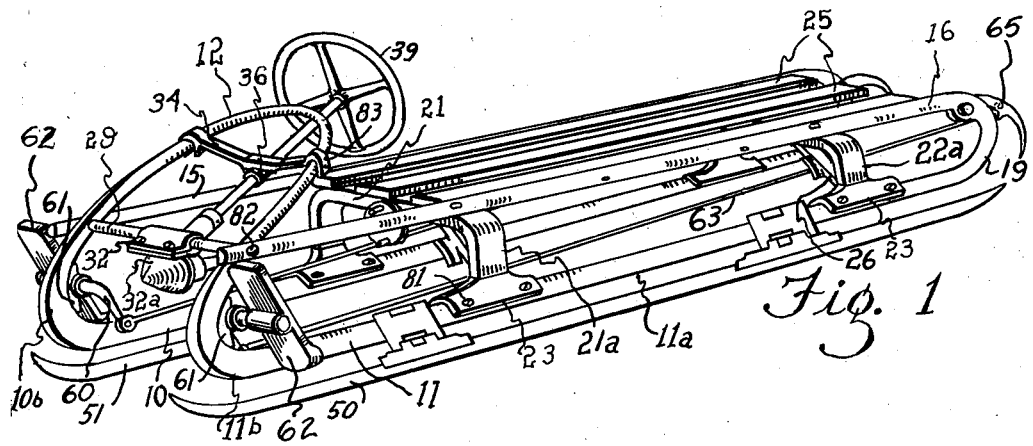
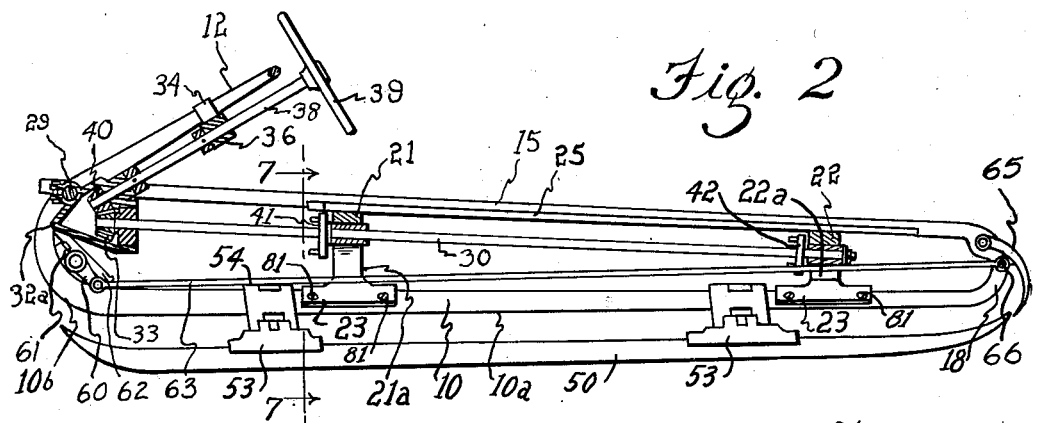
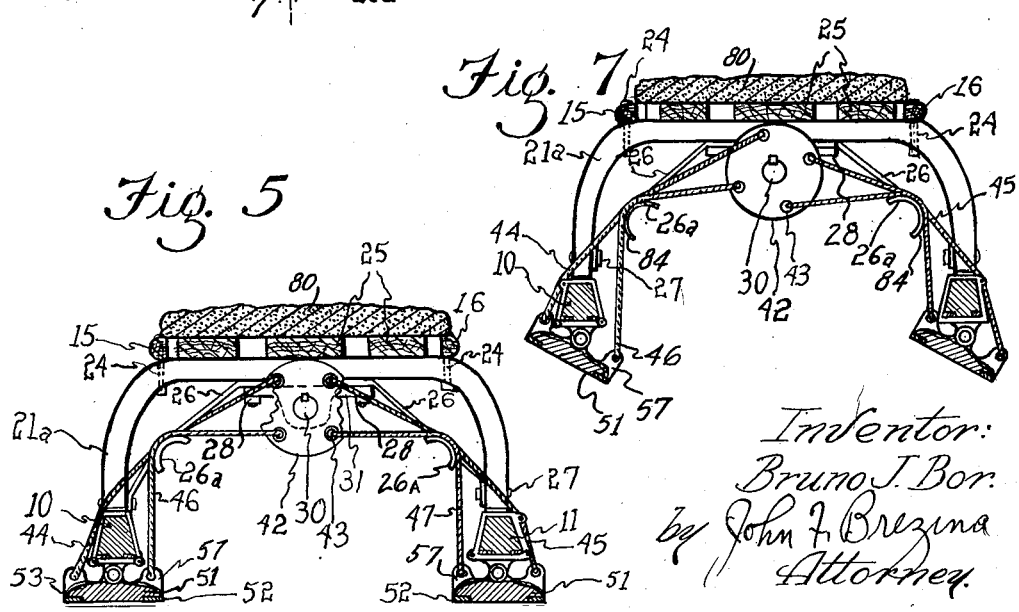
Inventor:
Bruno J. Bor.
by John F. Brezina
Attorney.

Dec. 5, 1950   B. J. BOR   2,532,887
SLED CONSTRUCTION

Filed Nov. 2, 1945   3 Sheets-Sheet 2

INVENTOR
Bruno J. Bor
BY John F. Brezina
ATTORNEY

Dec. 5, 1950  B. J. BOR  2,532,887
SLED CONSTRUCTION

Filed Nov. 2, 1945  3 Sheets-Sheet 3

INVENTOR.
Bruno J. Bor
BY John F Brezina
ATTORNEY

Patented Dec. 5, 1950

2,532,887

UNITED STATES PATENT OFFICE 2,532,887

SLED CONSTRUCTION

Bruno J. Bor, Chicago, Ill.

Application November 2, 1945, Serial No. 626,197

4 Claims. (Cl. 280—21)

This invention is directed to novel sleds, and particularly to the types of sleds adapted for use in sports and racing.

It is an object of my invention to provide novel sled constructions wherein a novelly built framework includes elongated runners having formed integral with the forward ends thereof an upwardly and rearwardly turned yoke or handle which is substantially U-shaped, and wherein relatively light auxiliary runners are detachably mounted to the main runners thereof for optional use according to the conditions of the snow and terrain encountered.

A further object of my invention is the provision of a novel sled construction having relatively light wood runners connected by a plurality of transverse arches which support the bed and securely hold the runners in proper parallel positions, and wherein the forward portions of the runners are curved forwardly and rearwardly in an inclined direction and merged in or connected by a single substantially U-shaped member to provide a relatively strong connecting and grippable handle unit.

A further object of my invention is the provision of a novel means for quickly, easily and detachably pivotally mounting auxiliary and separate runners upon the sled which are adapted to pivot transversely, and having novel guide means accessible to the operator adapted to transmit manual rotative movement to pivot the pivotally mounted runners to either side to thereby effectively steer a sled in desired course.

A further object is to provide an efficient relatively light though strong construction in which the elongated upper connecting bars are connected to the opposite upturned ends of the runners to effectively absorb impact and other stresses.

Other and further important objects of my invention will be apparent from the following description and appended claims.

On the drawings:

Fig. 1 is a perspective view of my novel sled, with certain parts broken away.

Fig. 2 is a cross-sectional view of the sled taken substantially on central longitudinal plane.

Fig. 5 is a partial cross-sectional view upon a transverse plane with parts broken away and illustrating the cable mounting means taken substantially on the line 5—5 of Fig. 3.

Fig. 7 is a cross-sectional view similar to Fig. 5 and showing the pivoted removable runners moved to transversely inclined positions.

Figures 4, 8:
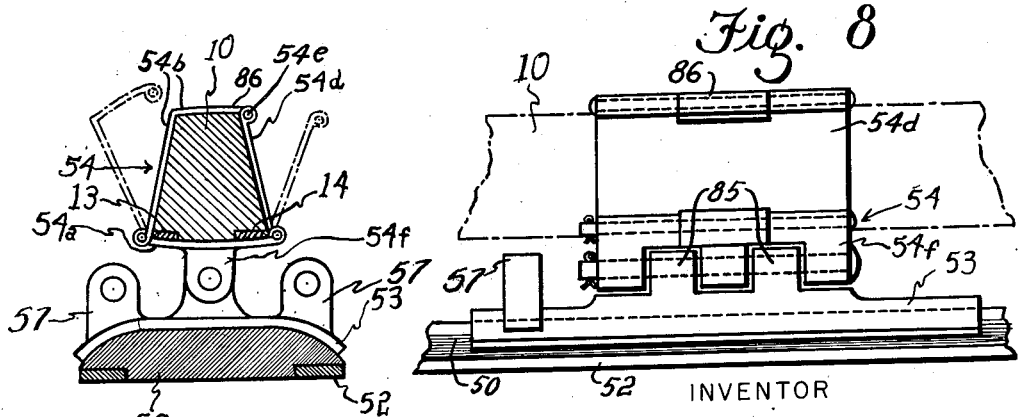
Fig. 4 is a cross-sectional view of one of the stationary runners, with attached auxiliary runner and showing a novel removable mounting and clamping bracket for the auxiliary runners.
Fig. 8 is an enlarged side elevational and fragmentary view of the mounting and clamping means for the removable runners.

Reference numerals 10 and 11 designate a pair of elongated relatively thin stationary runners which are preferably made of high grade straight grain wood, and which are preferably of trapezoidal cross section substantially as illustrated in Fig. 4. Each of said stationary runners 10 and 11 preferably have their respective bottom surfaces 10a and 11a facing downwardly substantially as illustrated, said surfaces being adapted to engage the ground and being relatively smooth to minimize friction to the greatest possible degree. The said stationary runners 10 and 11 are adapted to be utilized as terrain engaging or traction members in various types of conditions other than relatively soft snow, and wherein the firmness of the snow or combined snow and ice, or ice alone is such as to prevent the runners and sled from sinking too deeply into the supporting elements under such encountered conditions.

The forward end portions of the runners 10b and 11b respectively are bent in gradually upward curves substantially as illustrated, and are extended in an upwardly and rearwardly inclined direction substantially as illustrated in Fig. 1 and connected together in any suitable manner, as for example, by multiple laminations of suitably bent and beveled hard wood strips, to thereby form the U-shaped yoke and grippable handle member 12 whose upper and gradually curved end portion is disposed substantially above the bed of the sled as indicated.

Reference numerals 13 and 14 designate metal sheathing strips secured on the lower oval faces 10a and 11a respectively of runners 10 and 11, their securance being by suitable screws or equivalent fastening elements (not shown), and these strips are optional terrain-engaging members which have a relatively low co-efficient friction with snow or ice or combinations thereof. Said sheathing strips extend along the upwardly converging bottom surfaces 10a and 11a a short distance sufficient to guard, protect, and reduce wear on the forward curved portions of runners 10 and 11.

An important problem in the attainment of high speeds and manual control of racing and other sleds, particularly those used for competitive sports, is the attainment of light construction with more than adequate reserve strength in the frame-work and in its connecting means, and also the attainment of a minimum amount of bulk and deadweight, and of obstructions. One of the structural features helping to attain these objectives is the construction of the side frame members substantially integral or directly connected to the runners and with a complete absence of sharp corners in the respective parts of the frame-work. One of the structural features of my sled which assist in this accomplishment is the provision of a directly integral construction of the outer longitudinal connecting strips, designated by reference numerals 15 and 16 respectively, which are made as a continuation of and integral with the rear ends of runners 10 and 11 and whereby the curved rear end members 18 and 19 are formed in a manner to efficiently resist various impact and other stresses of the load and which impart a desirable degree of resilience to quick impacts encountered by a fast moving sled. Said connecting strips 15 and 16 lie closer together than the runners, and slightly inward toward the longitudinal center of the sled so that the curved rear end portions which connect the same with the rear end of the runners will more effectively resist greater transverse as well as downward stresses.

The forward ends of the side of the side rails 15 and 16 extend to points adjacent the upwardly curved front end members 10b and 11b respectively, and are suitably secured thereto by a fastening element such as cross rod 29 whose ends extend therethrough. Each of said side rails together with its integral rear end member and integral runner form a side frame of relatively great strength and with proper degree of resiliency to absorb sudden impact stresses.

Reference numerals 21 and 22 designate a pair of arches, or braces which are preferably made of a high quality wood preformed to provide gradually curved brace sections and lower end legs 21a and 22a, which legs are relatively straight in the portions thereof below said corner curves to thereby impart the greatest possible amount of strength and resist downward and transverse stresses.

The lower ends of each of the leg portions 21a and 22a of arches 21 and 22 are mounted in spaced apart relation on the upper edge surfaces of runners 10 and 11 and are connected and secured thereto by relatively short connecting brackets or plates 23 which in turn may be secured by suitable screws 81 passing through apertures therein (not shown), and into the braces and runners respectively.

The side rails 15 and 16, which lie inward of the runners, are secured to the upper curved portions of the arches 21 and 22 by rivets 24 or other suitable fastening elements. A plurality of relatively thin though strong strips 25, which are preferably hard wood, are secured to the arches 21 and 22 between rails 15 and 16, and in preferably spaced apart position, by suitable fastening elements such as screws. These terminate short of the front end of the sled as illustrated in the drawing.

A pair of diagonal metal braces 26 are secured by rivets 27 at their outer ends to leg portions of braces 21 and 22, as shown in Figs. 5 and 7 and 2, and the inner ends of said braces 26 are likewise secured by a bolt or rivet 28 to the central portion of said arches, said bolts 28 also securing journalling brackets 31.

As shown in Fig. 1, reference numeral 29 designates a front cross bar or rod whose ends extend through holes in front members 10b and 11b and in front ends of side rails 15 and 16, and are secured therein in a suitable manner, as by riveting the ends upon washers 62 or the like.

Numeral 30 designates a metal shaft which extends from a point adjacent rear arch 22 to a point forward or adjacent cross bar 29 and which is journalled in a pair of apertured journalling brackets 31 which are secured by the screws or rivets 28 adjacent undersurfaces of the center of the arches 21 and 22.

A journalling bracket 32 is suitably secured by screws on the center of the front cross bar 29 and has formed integral therewith a housing 32a which has journalled therein the front end portion of shaft 30 as illustrated in Fig. 2.

An angular cross bar 34 has its opposite ends secured by screws 33 or the like to the side portions of the yoke 12, and this connecting rod has secured on its center portion by welding or the like a journalling block 36, in which a steering column or shaft 38 is journalled. The upper end of said shaft 38 has mounted thereon a steering wheel 39, as illustrated in Figs. 1 and 2 and its lower end has mounted thereon a beveled gear 40 which meshes with gear 33 of shaft 30 so that rotation of said steering wheel and shaft will rotate shaft 30.

Secured on the shaft 30 substantially adjacent the edges of arches 21 and 22 are two spiders or apertured disks 41 and 42 whose apertures 43 are substantially spaced equally apart as indicated and whose apertures are a short distance inward of their peripheries. A pair of outer flexible cables, i. e. of twisted wire, 44 and 45, are secured at one end of each thereof to two of the holes 43 of disk 41. A similar pair of outer cables 44 and 45 are secured at one of their ends to rear disk 42. A pair of inner flexible cables 46 and 47 are secured to the lower apertures respectively of disk 41 and a similar pair of cables to the corresponding apertures of disk 42. The intermediate portions of the inner flexible cables 46 and 47 preferably extend and ride on the inner faces 84 of projecting extensions or flanges 26a of braces 26. The forward pair and rear pair of outer flexible cables 44 and 45 are illustrated in top plan view in Fig. 3 and these also move outside and partially above the aforesaid extensions 26a. Said flanges 26a thereby maintain said cables in locations where they will not traverse the space between the depending legs of the arches and where they will not engage protruding snow and ice over which the sled passes.

Referring to the drawings, numerals 50 and 51 designate a pair of hard wood relatively wide runners whose forward ends are bent upwardly and tapered, and each of which preferably though optionally have a pair of metal sheathing strips 52 recessed or countersunk in and secured by screws or the like on the opposite edge portions of their bottom faces. These metal strips 52 prevent undue wear upon the runners themselves and protect the edges thereof against injury due to impacts of hard objects. The upper faces of each of said runners 50 and 51 are preferably beveled and preferably tapered to relatively thinner side edges as shown.

Secured at two spaced apart points on the upper faces of each of the two auxiliary runners 50 and 51 are hinge or pivoting brackets 53 whose upwardly extending knuckles interfit with cooperating knuckles of the base portions 54a of clamps or saddles 54 respectively.

The clamps or saddles 54 each comprise a base 54a which has integral depending transversely apertured knuckles 54f which in turn are pivotally connected to cooperating knuckles 85 of the pivoting brackets 53 respectively. A secured pivotally connected side and top plate 54b and having hinge knuckles 86 at the end thereof as shown, and an outer side plate 54d pivoted at its lower end to base 54 and having hinge knuckles at its outer end which interfit with knuckles of plate 54b and which are removably securable together by insertion of a removable pin 54e. The size of the clamps 54 is such that when closed and mounted they will fit snugly on and about the stationary runners 10 and 11. As it is of material advantage to avoid drilling holes into the runners 10 and 11 to avoid weakening the same, my clamping means for detachably mounting the removable wider auxiliary runners 50 and 51 prevents any such weakening of the stationary runners, and likewise eliminates any optional holes which would be present if screw or bolt elements were employed as a means of connection. Any such holes would likewise increase the friction when the stationary runners were used directly as the traction means.

Figure 3:
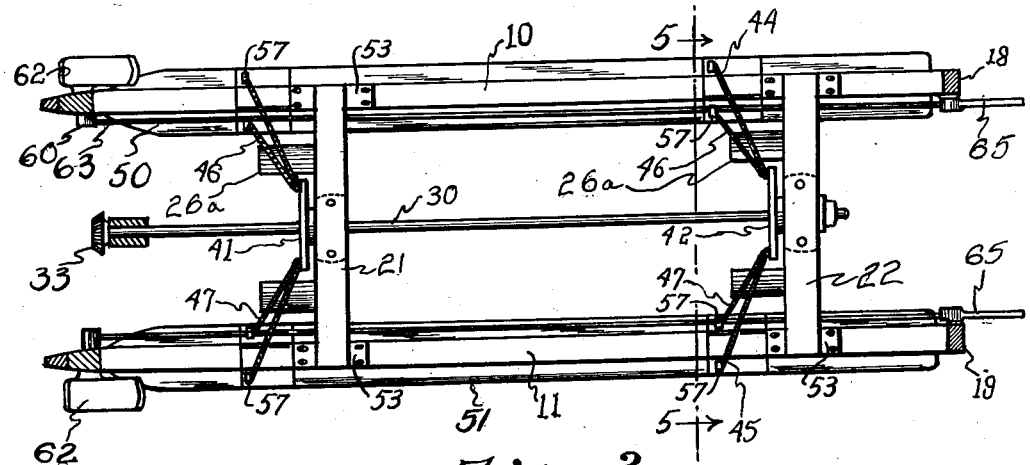
Fig. 3 is a top plan view of a frame of the sled with certain of the boards of the bed removed to show portions of the steering mechanism.
Figure 6:
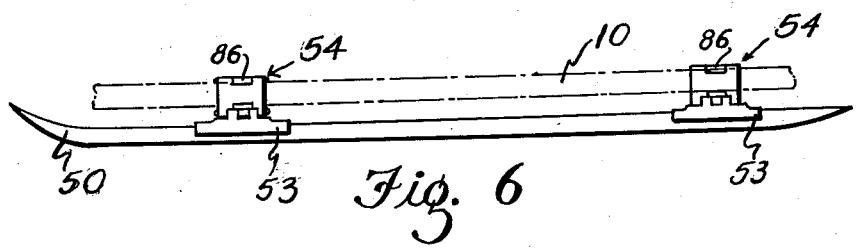
Fig. 6 is a side elevational view of the auxiliary runners clamped upon a stationary runner partially shown in dotted lines.

The opposite edge portions of each of the auxiliary runners 50 and 51 have connected thereto eyelet-like anchoring elements or brackets 57, such as illustrated in Figs. 3, 4 and 7, these being on the opposite edge portions of the bracket 53. The inner pairs of cables 46 and 47 are connected to the inner fastening elements 57 as illustrated in Figs. 3 and 4.

It will be understood from the foregoing description that rotation of the steering wheel 39 will transmit selective manual movement through the shaft 30, discs 41 and 42 and through the cables 44, 45, 46 and 47 to pivot the runners in unison to either side to a sufficient degree of inclination to satisfactorily and effectively guide and control the sled during forward movements.

It is to be understood that pivoting the runners to inclinations toward the left will cause the sled to run to the right, and pivoting of the runners to the right will cause the sled to run to the left. The degree of inclination will of course govern the rapidity of the curve of travel desired.

Referring to Figs. 1, 2, 9 and 10 reference numeral 60 designates one of a pair of metal crank arms of substantially right angled shape. Said crank arms are journalled in horizontal position adjacent the forward upwardly extending front end portion of the stationary runners 10 and 11 respectively by suitable journalling means exemplified by the brackets or mounting plates 61 only one of which is shown in Fig. 2 and which are secured by rivets or other suitable fastening elements to said runner front portions. The larger and horizontal portion of the crank arm 60 extends horizontally and outwardly and has suitably secured thereon levers or foot pedals or foot plates 62, said foot plates or levers 62 being secured intermediate their ends to said crank arms 60 respectively. Said foot plates 62 are normally inclined upwardly and forwardly so that the passenger may conveniently rest and brace his feet against same and operate the said crank arms as herein described.

The depending arm portions of the crank arm 60 have transverse apertures therein (not shown), and the forward apertured end portions of the two metal tie rods or connecting rods 63 are pivoted to the lower ends of said crank arms.

Pivotally secured upon the rear end portions of members 15 and 16 respectively are a pair of braking levers, arms or ground engaging members 65, substantially as illustrated in Figs. 1, 2, 3 and 9, said ground engaging members or arms being preferably curved forwardly and downwardly as illustrated. The length of said braking and ground engaging member 65 is such that when pivoted into downward positions the lower ends thereof will engage the ground or other terrain to the degree and with such force as desired by the operator. The apertured rear ends of the tie rod 63 are pivotally connected to the intermediate portions of the ground engaging members or snubbers 65 by suitable rivets or pins 66. It is to be understood that the passenger and operator whose feet will rest upon the foot pedal 62 may pivot the same to pull tie rod 63 forwardly and to cause ground or terrain engagement of the lower end portions of braking elements or members 65 to the desired degree, this effectively providing an auxiliary guiding means inasmuch as the operator, when desiring to turn relatively sharply to one or the other side will manually depress the lower portion of the foot pedal on the side toward which he desires to turn and that the ground engaging and snubbing action of the member 65 on such side will cause the sled to turn relatively sharply toward such side. This in addition to the turning movement already imparted by manual operation and pivoting of the auxiliary runners in the manner hereinbefore described.

Figure 9:
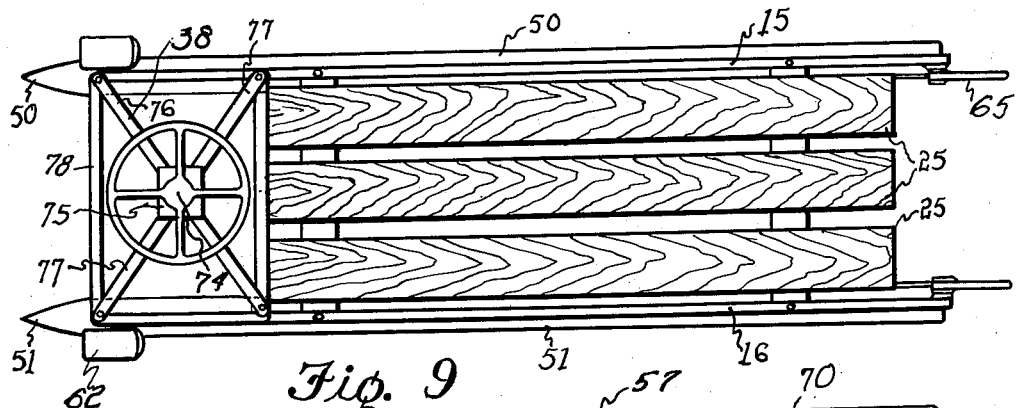
Fig. 9 is a top plan view of my sled embodying a slight modification thereof wherein a single pair of runners are removably mounted.
Figure 10:
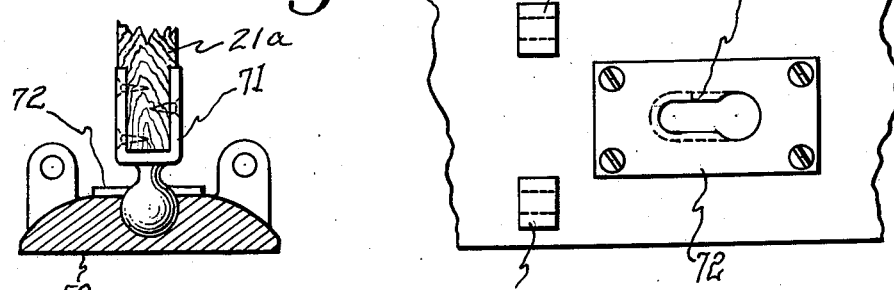
Fig. 10 is an enlarged fragmentary view taken on a transverse plane of one of the runners partially shown in Fig. 9.
Figure 11:
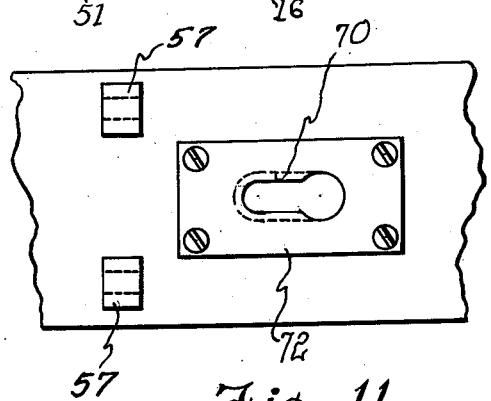
Fig. 11 is an enlarged fragmentary view looking from above upon a segment of one of said runners at the point of its normal connection with the sled frame.
Figure 12:
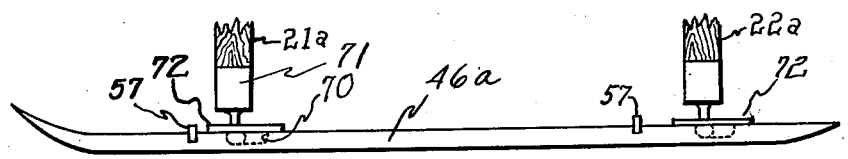
Fig. 12 is a side elevational view of one of the removable runners directly, though detachably, connected to the depending portions of the sled frame arch members.
Figure 13:
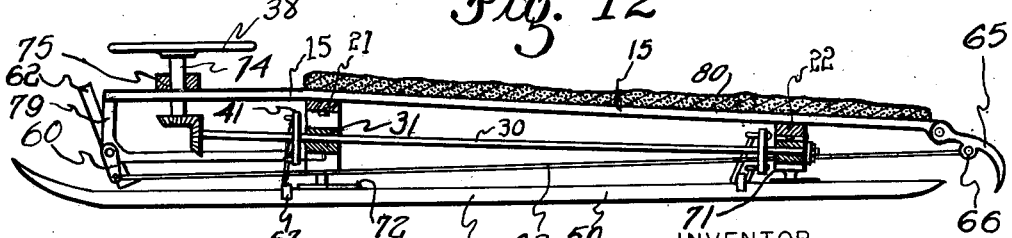
Fig. 13 is a partially cross-sectional view upon a central plane longitudinally through the sled, and illustrating the manually operable guide means and braking means and removable runner.

In Figs. 9 to 13 inclusive I illustrate a modified embodiment of my invention in which the sled frame structure which has heretofore been described is substantially similar, with the exception that the yoke 12 is omitted and the stationary runners 10 and 11 are omitted as well as certain parts as will be explained hereinafter. Referring to Figs. 9 and 10, the runners 50 and 51 have their forward ends bent gradually upwardly as indicated in Figs. 12 and 13 and each of said runners has two spaced apart bayonet slots or recesses 70 formed therein as illustrated in Figs. 10 and 11 into which the ball-shaped members 71 are normally and removably mounted and retained in position to removably mount the runners 50 thereon with the aid of slotted apertured retaining or securing plates 72 which are normally mounted in the position to hold the runners so that the neck portions of said members 71 are disposed in the narrow slotted portion of the openings through said plates 72, substantially as illustrated in Fig. 12.

As shown in Figs. 11 and 12 the metal runners 50 and 51 which are preferably formed of a relatively light metal such as aluminum or relatively light alloy, have secured thereto and carry the cable anchoring ears or elements 57 thereon, there being two pairs thereof on each runner and extending upwardly adjacent opposite edges of each of said runners as indicated in Figs. 10 and 12. The leg portions 21a and similarly 22a of the arches 21 and 22 respectively have their lower ends preferably reduced and secured within the cylindrical upper portion of the ball-shaped member 71, preferably with the aid of suitable screws as indicated in dotted lines in Fig. 10, thereby securely mounting the said ball-shaped members 71 with respect to both legs of both the front and rear arches 21 and 22. For clarity, no parts of the cables of the guiding means hereinbefore described are shown in Figs. 10, 11 and 12, though fragments thereof are illustrated in Fig. 13.

As shown in Fig. 9 wherein transversely pivotal light metal runners 50 and 51 are utilized, the means for transmitting manual movement through the longitudinal shaft 30 and through the cables to the pivotally mounted runners 50 and 51 comprise relatively shorter steering shaft 74 having the hand wheel 38 secured on the upper end thereof, said steering shaft or column 74 being journalled to suitable journalling block 75 as shown in Figs. 9 and 13, said block being suitably secured upon intersecting transversely extending braces 76, 77 shown in Fig. 9.

The extreme end portion of said braces 76 and 77 are secured by rivets or equivalent fastening elements to the forward end portions of the straps 15 and 16 respectively.

Numeral 78 designates a transversely extending connecting bar which connects the forward ends of the frame strips 15 and 16, the same being secured preferably by the same rivets as pass through the foremost end portions of the intersecting bars 76 and 77. It will be understood that the operator, as the passenger in foremost position on said sled, may control the steering wheel 38 to in turn control and selectively adjust the positions of the two pivotally mounted runners 50 and 51, and that such operator may preferably have his feet raised against the fulcrummed pedals 62, the movement of which in clockwise direction looking at Fig. 13 is adapted to pull the arcuate braking members 65 into terrain engaging position for the purpose of either bringing the sled to a stop, or slowing it down, or of more rapidly causing it to turn to either side inasmuch as terrain engagement by a right hand braking element will aid in causing the sled to turn to the right, and vice versa when the left hand braking element is caused to engage the terrain, these braking elements acting simultaneously and aiding and cooperating with the pivotally mounted runners 50 and 51 cause the sled to turn or curve to the desired degree either to the left or right.

As shown in Fig. 13, a right angled metal bracket 79 is secured at its upper end to the foremost end portion of strip 15 and extends downwardly and then substantially horizontally and rearwardly to be secured upon the portion 21a of the arch 21. Fig. 12 being a partially cross sectional view showing the right hand portion of the sled, shows only one of said right angled brackets 79, it being understood that a similar mounting bracket 79 is secured at the left hand side of the sled to provide a mounting means for the crank arm 60 and means for supporting both said crank arms and said foot pedals or levers 62.

Numeral 80 is merely illustrative of an optional pad adapted to be placed upon the bed of the sled and optionally secured thereto in any suitable manner.

The provision of relatively easily removably light metal runners 50 and 51 in a manner exemplified in Figs. 10, 11 and 12, permits a change of different widths of runners to best suit the requirements of the particular course or terrain to be encountered at a particular time. For example, where a relatively well-packed or hard terrain is encountered, the user, having provided himself with two or more pairs of runners, may easily mount the relatively narrow pair, whereas on softer snow and unbroken, unused surfaces, the user would mount and use relatively wider runners.

I desire it to be understood that my sled is especially adaptable for racing as well as sports use in general and likewise may be used for transportation purposes.

The invention has been described herein more or less precisely as to details, yet it is to be understood that the invention is not to be limited thereby, as changes may be made in the arrangement and proportion of parts and equivalents may be substituted, without departing from the spirit and scope of the invention.

I claim:

1. In a sled, a pair of parallel runners having their forward ends extending upwardly and joined together, a pair of side rails having downwardly curved rear end portions merging with the rear end portions of said runners, a plurality of U-shaped arches connecting said runners and said side rails, auxiliary runners removably and movably mounted on said first mentioned runners, a journalled longitudinal shaft, a manually operable steering shaft operatively connected to said shaft; and a plurality of cable means connecting said longitudinal shaft and said auxiliary runners whereby rotation of said shaft will move said runners transversely to permit guiding of said sled.

2. In a sled construction, a pair of parallel runners having their forward ends extending upwardly and joined together, a pair of side rails; a plurality of U-shaped arches connecting said runners and said side rails, auxiliary runners movably mounted on said first mentioned runners; a longitudinal shaft journalled on said arches; spaced apart disk members mounted on said shaft, a manually operable steering shaft operatively connected to said longitudinal shaft; and cables connecting said disk members and opposite edge portions of said auxiliary shafts, whereby rotation of said shafts pivots said auxiliary runners to desired position.

3. In combination with a sled, a pair of pivotally mounted auxiliary runners; removable clamping members having hinge elements thereon connected to said auxiliary runners respectively; said clamping members providing for removable mounting of said auxiliary runners; and manually operable mechanism mounted on said sled for selectively pivoting said auxiliary runners to permit guiding of said sled, said operable mechanism being adapted to selectively move said auxiliary runners without operably moving any of the other sled elements.

4. In a sled construction, a pair of parallel runners having their rear ends curved upwardly and having continuous side rails extending forwardly to the front upper portions of said runners respectively; a plurality of U-shaped arches connecting said runners and said side rails, auxiliary runners movably mounted on said first mentioned runners, said auxiliary runners having clamping members pivotally connected to said auxiliary runners, said clamping members being removably mountable on said stationary runners; and manually operable mechanism mounted on said sled for selectively moving said auxiliary runners without moving said parallel runners.

BRUNO J. BOR.

REFERENCES CITED

The following references are of record in the file of this patent:

UNITED STATES PATENTS

| Number | Name | Date |
|---|---|---|
| 861,946 | Brandner | July 30, 1907 |
| 1,160,569 | Bourdon et al. | Nov. 16, 1915 |
| 1,242,514 | Bourdon et al. | Oct. 9, 1917 |
| 1,303,388 | Reach | May 13, 1919 |
| 1,600,735 | Pederson | Sept. 21, 1926 |
| 1,888,857 | Greene | Nov. 22, 1932 |
| 2,317,048 | Fosbak | Apr. 20, 1943 |

FOREIGN PATENTS

| Number | Country | Date |
|---|---|---|
| 14,496 A. D. 1908 | Great Britain | July 8, 1908 |
| 23,550 A. D. 1912 | Great Britain | Oct. 15, 1912 |
| 46,758 | Sweden | Mar. 31, 1920 |